(12) United States Patent
Zhang

(10) Patent No.: US 11,434,427 B2
(45) Date of Patent: Sep. 6, 2022

(54) SELF-ALIGNING MATERIAL, SELF-ALIGNING LIQUID CRYSTAL MATERIAL, AND LIQUID CRYSTAL DISPLAY PANEL

(71) Applicant: TCL China Star Optoelectronics Technology Co., Ltd., Shenzhen (CN)

(72) Inventor: Yu Zhang, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 360 days.

(21) Appl. No.: 16/626,331

(22) PCT Filed: Dec. 3, 2019

(86) PCT No.: PCT/CN2019/122525
§ 371 (c)(1),
(2) Date: Dec. 24, 2019

(87) PCT Pub. No.: WO2021/093042
PCT Pub. Date: May 20, 2021

(65) Prior Publication Data
US 2021/0324273 A1 Oct. 21, 2021

(30) Foreign Application Priority Data
Nov. 14, 2019 (CN) .......................... 201911110045.3

(51) Int. Cl.
*C09K 19/40* (2006.01)
*C09K 19/04* (2006.01)

(52) U.S. Cl.
CPC .......... *C09K 19/408* (2013.01); *C09K 19/406* (2013.01); *C09K 2019/0444* (2013.01)

(58) Field of Classification Search
CPC ................ C09K 19/408; C09K 19/406; C09K 2019/0444
See application file for complete search history.

(56) References Cited

U.S. PATENT DOCUMENTS

| | | | |
|---|---|---|---|
| 2016/0077365 A1* | 3/2016 | Park ..................... | H01L 27/1218 438/30 |
| 2016/0147116 A1* | 5/2016 | Park .................. | G02F 1/133711 445/24 |
| 2018/0057746 A1* | 3/2018 | Lan .................... | G02F 1/133514 |
| 2019/0041674 A1* | 2/2019 | Suh ....................... | G02F 1/1343 |
| 2019/0308926 A1* | 10/2019 | Lan .................. | G02F 1/133711 |
| 2021/0324273 A1* | 10/2021 | Zhang .................. | C09K 19/408 |

FOREIGN PATENT DOCUMENTS

| | | |
|---|---|---|
| CA | 1047244 | 1/1979 |
| CN | 105425473 | 3/2016 |
| CN | 105542796 | 5/2016 |

(Continued)

*Primary Examiner* — Ryan Crockett

(57) ABSTRACT

A self-aligning material, a self-aligning liquid crystal material, and a liquid crystal panel are provided. The self-aligning material is a nano-surfactant having a conductive material-philic end and a liquid crystal material-philic end, which can align liquid crystal molecules. Thus, it is unnecessary to dispose a polyimide alignment layer in the liquid crystal panel. As a result, the polyimide alignment layer and its manufacturing are saved, and production cost is reduced.

8 Claims, 2 Drawing Sheets

(56) References Cited

FOREIGN PATENT DOCUMENTS

| | | |
|---|---|---|
| CN | 105629583 | 6/2016 |
| CN | 106398723 | 2/2017 |
| CN | 106833677 | 6/2017 |
| CN | 108333837 | 7/2018 |
| CN | 108681158 | 10/2018 |
| CN | 110275345 | 9/2019 |
| WO | WO 2019/180060 | 9/2019 |

* cited by examiner

SELF-ALIGNING MATERIAL, SELF-ALIGNING LIQUID CRYSTAL MATERIAL, AND LIQUID CRYSTAL DISPLAY PANEL

RELATED APPLICATIONS

This application is a National Phase of PCT Patent Application No. PCT/CN2019/122525 having International filing date of Dec. 3, 2019, which claims the benefit of priority of Chinese Patent Application No. 201911110045.3 filed on Nov. 14, 2019. The contents of the above applications are all incorporated by reference as if fully set forth herein in their entirety.

FIELD AND BACKGROUND OF THE INVENTION

The present invention relates to the field of display technology, and more particularly, to a self-aligning material, a self-aligning liquid crystal material, and a liquid crystal display panel.

With the development of display technology, liquid crystal displays (LCDs) and other planar display devices have been widely used in various consumer electronic products such as mobile phones, televisions, and notebook computers, and have become mainstream in display devices due to their advantages such as high image quality, power saving, thin body, and wide applications.

A display panel of a liquid crystal display is usually formed by a color filter (CF) substrate, a thin film transistor (TFT) substrate, liquid crystals (LCs) provided between the color filter substrate and the thin film transistor substrate, and a sealant. There is a layer of alignment film (polyimide material is commonly used) provided over the CF substrate and the TFT substrate, so that liquid crystal molecules can be aligned in a certain direction, and an orientation of the liquid crystal molecules can be controlled during a power on/off process to realize turn on and off of the LCD.

However, polyimide materials have the following disadvantages: first, polyimide materials are expensive; second, solvents for the polyimide materials can easily cause harm to human body; and third, a film-forming process of the polyimide materials is complicated and related equipment is expensive. Therefore, if fabrication steps of the polyimide alignment layer during a manufacturing process of the display panel of the liquid crystal display can be omitted, harms to environment and people can be reduced and cost can be greatly saved.

SUMMARY OF THE INVENTION

During the manufacturing process of the display panel of the liquid crystal display, the use of polyimide materials has the following disadvantages: first, polyimide materials are expensive; second, solvents for the polyimide materials can easily cause harm to the human body; and third, the film-forming process of polyimide materials is complicated and the related equipment is expensive.

To solve the above problems, the present invention provides a self-aligning material, a self-aligning liquid crystal material, and a liquid crystal panel.

The present invention provides a self-aligning material, wherein the self-aligning material is a nano-surfactant having a conductive material-philic end and a liquid crystal material-philic end.

In one embodiment, the conductive material-philic end of the nano-surfactant is silicon oxide.

In one embodiment, a surface of the conductive material-philic end of the nano-surfactant has a hydroxyl group.

In one embodiment, the conductive material-philic end of the nano-surfactant has a spherical structure.

In one embodiment, the liquid crystal material-philic end of the nano-surfactant is organic silicone.

In one embodiment, a surface of the liquid crystal material-philic end of the nano-surfactant has an amino group.

In one embodiment, the liquid crystal-philic material end of the nano-surfactant has an island structure.

The present invention further provides a self-aligning liquid crystal material, comprising liquid crystal molecules and the above self-aligning material.

In one embodiment, a mass percentage of the self-aligning material in the self-aligning liquid crystal material is 0.03% to 10%.

The present invention further provides a liquid crystal panel, comprising a first substrate and a second substrate opposite to each other, a first electrode disposed over the first substrate at a side facing a second substrate side, and a first substrate disposed over the second substrate at a side facing a first substrate, and a liquid crystal layer provided between the first electrode and the second electrode, wherein the liquid crystal layer comprises the self-aligning liquid crystal material according to claim 8, and the liquid crystal molecules have a pretilt angle.

The beneficial effect of the present invention is that the present invention provides a self-aligning material, a self-aligning liquid crystal material, and a liquid crystal panel. The self-aligning material is a nano-surfactant having a conductive material-philic end and a liquid crystal material-philic end, which can perform liquid crystal molecules alignment, so there is no need to provide a polyimide alignment layer in the liquid crystal panel. The self-aligning liquid crystal material of the present invention contains the above self-aligning material, so the self-aligning material can align the liquid crystal molecules. Therefore, it is not necessary to dispose the polyimide alignment layer in the liquid crystal panel, thereby saving the polyimide alignment layer and its production as well as reducing production costs. The liquid crystal panel of the present invention uses the self-aligning liquid crystal material to realize the alignment of liquid crystal molecules, and there is no need to dispose the polyimide alignment layer, thus reducing production costs.

BRIEF DESCRIPTION OF THE SEVERAL VIEWS OF THE DRAWINGS

To detailly explain the technical schemes of the embodiments or existing techniques, drawings that are used to illustrate the embodiments or existing techniques are provided. Obviously, the illustrated embodiments are just a part of those of the present disclosure. It is easy for any person having ordinary skill in the art to obtain other drawings without labor for inventiveness.

DESCRIPTION OF SPECIFIC EMDBODIMENTS OF THE INVENTION

Figure 1:
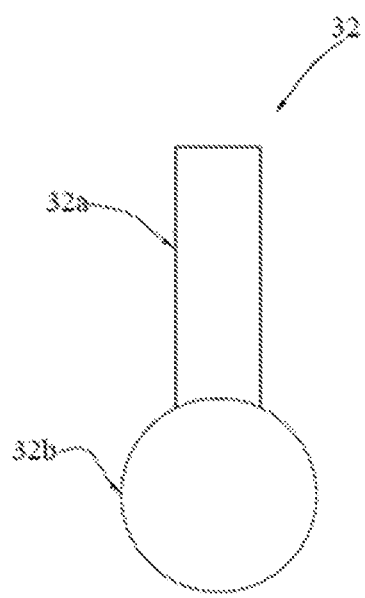
FIG. 1 is a schematic diagram of a self-aligning material according to an embodiment of the present invention.

FIG. 1 is a schematic diagram of a self-aligning material 32 according to an embodiment of the present invention.

Please refer to FIG. 1, the self-aligning material 32 of the present invention is a nano-surfactant having a conductive material-philic end 32b and a liquid crystal material-philic end 32a.

In one embodiment, a surface of the conductive material-philic end 32b of the self-aligning material 32 has a hydroxyl group, which forms a strong hydrogen bond with a surface of a conductive material such as indium tin oxide (ITO), thereby forming the conductive material-philic end. The conductive material-philic end 32b has a spherical structure, and may be formed of materials such as silicon oxide and dopamine.

In one embodiment, a surface of the liquid crystal-philic material end 32a of the self-aligning material 32 has an amino group, which is advantageous for grafting with liquid crystal molecules, such as bisbenzene molecules with a liquid crystal structure, and hydrophobic carbon materials which are materials with strong reaction with liquid crystal molecules, thereby forming the liquid crystal material-philic end. A strong intermolecular force between the liquid crystal material-philic end and the liquid crystal molecules will help the alignment of the liquid crystal molecules. The liquid crystal material-philic end 32a is an island structure, and can be formed of a silicone material.

In one embodiment, the self-aligning material 32 of the present invention shown in FIG. 1 can be synthesized by a sol-gel method. Since the self-aligning material 32 has amphiphilic properties to conductive materials and liquid crystal materials, alignment force can be enhanced and reliability issues can be prevented. Two ends of the conductive material-philic end 32b and the liquid crystal material-philic end 32a of the self-aligning material 32 can be selected according to the liquid crystal material to be used, and have wide liquid crystal applicability.

In one embodiment, tetraethoxysilane (TEOS) can be selected in an alkaline solution to prepare silicon oxide spheres for functioning as the conductive material-philic end 32b of the self-aligning material 32. Commercially available polystyrene (PS) pellets can be selected as the core and are floated in a two-phase solvent (water:n-hexane=1:1 to 1:0.4) to fabricate silicon oxide spheres. The silicon oxide spheres are formed by condensation of tetraethoxysilane, and their surface is rich in hydroxyl groups. Organo-silanes such as aminopropyltriethoxysilane (APTES) are next added to the above solution, and organo-silanes can quickly nucleate in the aqueous phase due to fast reaction properties and easily continue to grow over the surface of the microspheres, thereby forming an organic silicon layer with an island-like heterostructure over the surface of the silicon oxide spheres, and serving as the self-aligning material 32 and the liquid crystal material-philic end 32a. The organic silicon layer is rich in amino groups, which is advantageous to subsequent grafting of liquid crystal molecules, and finally, the nano-surfactant with a large difference in hydrophilicity and hydrophobicity at both ends is obtained for use in liquid crystal self-alignment. The formed amphiphilic nano-surfactant has a structure as shown in FIG. 1.

The present invention also provides a self-aligning liquid crystal material comprising liquid crystal molecules and the self-aligning material 32 of the present invention shown in FIG. 1. According to an embodiment of the present invention, a mass percentage of the self-aligning material 32 in the self-aligning liquid crystal material is 0.03% to 10%, preferably 0.03% to 1%. The self-aligning liquid crystal material of the present invention can play a role in different liquid crystal modes such as a vertical alignment type (VA type), a horizontal alignment type (IPS type), a light alignment type (FFS type), and the like.

Figure 2:
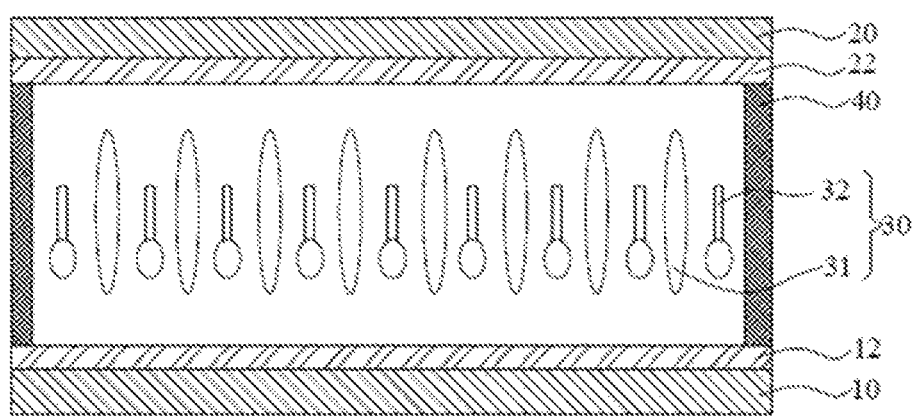
FIG. 2 is a schematic structural diagram of a liquid crystal panel according to an embodiment of the present invention.

FIG. 2 is a schematic structural diagram of a liquid crystal panel according to an embodiment of the present invention.

Please refer to FIG. 2, the present invention further provides a liquid crystal panel comprising a first substrate 10 and a second substrate 20 opposite to each other, a first electrode 12 disposed over a surface at a side of the first substrate 10 facing the second substrate 20, a second electrode 22 disposed over a surface at a side of the second substrate 20 facing the first substrate 10, and a liquid crystal layer 30 disposed between the first electrode 12 and the second electrode 22.

A material of the first electrode 12 and the second electrode 22 can be, for example, a common conductive material such as indium tin oxide (ITO). The liquid crystal layer 30 comprises the self-aligning liquid crystal material of the present invention, which comprises liquid crystal molecules 31 and the self-aligning material 32, and the liquid crystal molecules 31 have a pretilt angle. The liquid crystal layer 30 can function in different liquid crystal modes such as a vertical alignment type (VA type), a horizontal alignment type (IPS type), and a light alignment type (FFS type). Specifically, the liquid crystal panel further comprises a sealant 40 disposed between the first substrate 10 and the second substrate 20 and located at a periphery of the liquid crystal layer 30. The self-aligning material 32 can be sufficiently mixed with the liquid crystal molecules 31 by stirring to obtain a liquid crystal material with self-aligning properties. The liquid crystal material can be added to the liquid crystal panel device without a polyimide alignment layer through a way such as pouring or printing, thereby completing the fabrication of the self-aligning liquid crystal panel.

Specifically, the first substrate 10 and the second substrate 20 are a color filter substrate and a thin film transistor array substrate, respectively. The first electrode 12 and the second electrode 22 are a common electrode and a pixel electrode, respectively.

Figure 3:
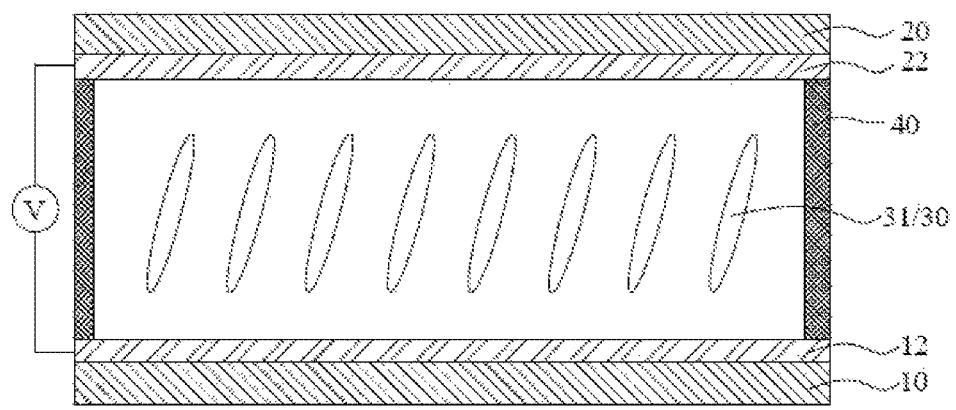
FIG. 3 is a schematic structural diagram when a voltage is applied to a liquid crystal panel according to an embodiment of the present invention.

FIG. 3 is a schematic structural diagram when a voltage is applied to a liquid crystal panel according to an embodiment of the present invention.

Please refer to FIG. 3, when a voltage is applied to the liquid crystal panel of FIG. 2, a stable hydrogen bond is formed by the conductive material-philic end 32b in the nano-surfactant of the self-aligning material 32 with the first electrode 12 and the second electrode 22, and a stable intermolecular force is formed by the liquid crystal-philic material end 32b of the self-aligning material 32 and the liquid crystal layer 30 in the nano-surfactant. During the alignment process, the self-aligning material 32 will form hydrogen bonds with the substrate surface, and due to intermolecular forces between the liquid crystal molecules of the liquid crystal layer 30, a stable alignment interface will be formed, so that the liquid crystal molecules can be stably self-aligned without assistant of a conventional polyimide alignment layer. Therefore, the liquid crystal panel utilizes the self-aligning material 32 to control the orientation of the liquid crystal molecules 31 of the liquid crystal layer 30 during the application of power on-off process of the liquid crystal panel 30 to realize the on/off control of the liquid crystal panel and the alignment of the liquid crystal molecules 31. The liquid crystal molecules 31 have pretilt angles, and there is no need to provide a polyimide alignment layer, thereby achieving good alignment of the liquid crystal molecules 31.

The liquid crystal material in the liquid crystal panel according to the embodiment of the present invention uses an amphiphilic nano-surfactant to replace the PI layer to build a stable self-aligning liquid crystal material, thereby reducing the PI fabrication process and saving cost and time. In addition, the amphiphilic nano-surfactant of the present invention can balance the affinity between the liquid crystal material and the substrate, enhance the alignment force, and prevent issues such as poor alignment and poor reliability caused by insufficient alignment force. The amphiphilic nano-surfactant of the present invention has a wide selection at both ends and strong liquid crystal applicability.

In summary, the present invention provides a self-aligning material, a self-aligning liquid crystal material, and a liquid crystal panel. The self-aligning material is a nano-surfactant having a conductive material-philic end and a liquid crystal material-philic end, which can align liquid crystal molecules. Therefore, it is not necessary to provide a polyimide alignment layer in the liquid crystal panel. The self-aligning liquid crystal material of the present invention comprises the above self-aligning material. The self-aligning material can align liquid crystal molecules. Therefore, it is not necessary to dispose the polyimide alignment layer in the liquid crystal panel, thereby saving the polyimide alignment layer and its production, as well as reducing production costs. The liquid crystal panel of the present invention uses the self-aligning liquid crystal material to realize the alignment of liquid crystal molecules, and there is no need to provide the polyimide alignment layer, thereby reducing the production cost.

Embodiments

Fabrication of a First Self-Aligning Material 1 is as Follows:

10 grams of tetraethoxysilane (TEOS) are weighed and added into 100 ml of an aqueous ammonia solution with a pH of 8 to prepare silicon oxide spheres which are used as a conductive material-philic end 32b of a self-aligning material 32, under room temperature and pressure. Commercially available polystyrene (PS) pellets are used as cores of TEOS and floated in 150 ml of a two-phase solvent (water:n-hexane=1:1 to 1:0.4) to prepare silicon oxide spheres. 4 ml of aminopropyltriethoxysilane (APTES) of organo-silane are continuously added to the above solution, thereby forming an island-like heterostructured organosilicon layer over a surface of the silicon oxide spheres to function as the self-aligning material 32 and the liquid crystal material-philic end 32a, and a nano-surfactant with a large difference in hydrophilicity and hydrophobicity at both ends is finally obtained, which is used for liquid crystal self-alignment.

Fabrication of Self-Aligning Material 2 is as Follows:

5 grams of polydopamine are weighed and added into 100 ml of a weak alkaline solution of trismethylaminomethane (TRIS) with a pH of 8 to fabricate dopamine spheres which are used as a conductive material-philic end 32b of a self-aligning material 32, under room temperature and normal pressure. The dopamine spheres can be selected from silica-coated ferric oxide spheres and floated in 150 ml of a two-phase solvent (water:n-hexane=1:1 to 1:0.4) to prepare the dopamine spheres. 3 ml of organosilane (APTES) are continuously added to the above solution, thereby forming an island-like heterostructured silicone layer over a surface of the dopamine spheres to function as the self-aligning material 32 and the liquid crystal material-philic end 32a, Finally, a nano-surfactant with a large difference in hydrophilicity and hydrophobicity at both ends is finally obtained, which is used for liquid crystal self-alignment.

Fabrication of Self-Aligning Liquid Crystal Material 1 is as Follows:

0.03 g of the above-mentioned self-aligning material 1 and 100 g of vertical alignment type (VA type) liquid crystal material are weighed. A mass percentage of the self-aligning material in a self-aligning liquid crystal material is 0.03%, and the liquid crystal material is carried out by mechanical stirring to mix well and obtain a liquid crystal material with self-aligning property. The liquid crystal material can be added to a liquid crystal panel device without a polyimide alignment layer in a method such as pouring or printing to complete fabrication of a self-aligning liquid crystal panel.

Fabrication of Self-Aligning Liquid Crystal Material 2 is as Follows:

0.5 g of the above-mentioned self-aligning material 1 and 100 g of vertical alignment type (VA type) liquid crystal material are weighed. A mass percentage of the self-aligning material in a self-aligning liquid crystal material is 0.5%, and the liquid crystal material is carried out by mechanical stirring to mix well and obtain a liquid crystal material with self-aligning property. The liquid crystal material can be added to a liquid crystal panel device without a polyimide alignment layer in a method such as pouring or printing to complete fabrication of a self-aligning liquid crystal panel.

Fabrication of Self-Aligning Liquid Crystal Material 3 is as Follows:

1 g of the above-mentioned self-aligning material 1 and 100 g of vertical alignment type (VA type) liquid crystal material are weighed. A mass percentage of the self-aligning material in a self-aligning liquid crystal material is 10%, and the liquid crystal material is carried out by mechanical stirring to mix well and obtain a liquid crystal material with self-aligning property. The liquid crystal material can be added to a liquid crystal panel device without a polyimide alignment layer in a method such as pouring or printing to complete fabrication of a self-aligning liquid crystal panel.

Fabrication of Self-Aligning Liquid Crystal Material 4 is as Follows:

0.04 g of the above-mentioned self-aligning material 2 and 10 g of vertical alignment type (VA type) liquid crystal material are weighed. A mass percentage of the self-aligning material in a self-aligning liquid crystal material is 0.04%, and the liquid crystal material is carried out by mechanical stirring to mix well and obtain a liquid crystal material with self-aligning property. The liquid crystal material can be added to a liquid crystal panel device without a polyimide alignment layer in a method such as pouring or printing to complete fabrication of a self-aligning liquid crystal panel.

Fabrication of Self-Aligning Liquid Crystal Material 5 is as Follows:

0.5 g of the above-mentioned self-aligning material 2 and 10 g of vertical alignment type (VA type) liquid crystal material are weighed. A mass percentage of the self-aligning material in a self-aligning liquid crystal material is 0.5%, and the liquid crystal material is carried out by mechanical stirring to mix well and obtain a liquid crystal material with self-aligning property. The liquid crystal material can be added to a liquid crystal panel device without a polyimide alignment layer in a method such as pouring or printing to complete fabrication of a self-aligning liquid crystal panel.

Fabrication of Self-Aligning Liquid Crystal Material 6 is as Follows:

1 g of the above-mentioned self-aligning material 2 and 10 g of vertical alignment type (VA type) liquid crystal material are weighed. A mass percentage of the self-aligning material in a self-aligning liquid crystal material is 10%, and the liquid crystal material is carried out by mechanical stirring to mix well and obtain a liquid crystal material with self-aligning property.

The liquid crystal material can be added to a liquid crystal panel device without a polyimide alignment layer in a method such as pouring or printing to complete fabrication of a self-aligning liquid crystal panel.

While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:

1. A self-aligning material, wherein the self-aligning material is a nano-surfactant having a conductive material-philic end and a liquid crystal material-philic end;
   the conductive material-philic end of the nano-surfactant is silicon oxide; and
   a surface of the conductive material-philic end of the nano-surfactant has a hydroxyl group.

2. The self-aligning material according to claim 1, wherein the conductive material-philic end of the nano-surfactant has a spherical structure.

3. The self-aligning material according to claim 1, wherein the liquid crystal material-philic end of the nano-surfactant is organic silicone.

4. The self-aligning material according to claim 1, wherein a surface of the liquid crystal material-philic end of the nano-surfactant has an amino group.

5. The self-aligning material according to claim 1, wherein the liquid crystal-philic material end of the nano-surfactant has an island structure.

6. A self-aligning liquid crystal material, comprising liquid crystal molecules and the self-aligning material according to claim 1.

7. The self-aligning liquid crystal material according to claim 6, wherein a mass percentage of the self-aligning material in the self-aligning liquid crystal material is 0.03% to 10%.

8. A liquid crystal panel, comprising a first substrate and a second substrate opposite to each other, a first electrode disposed over the first substrate at a side facing the second substrate, a second electrode disposed over the second substrate at a side facing the first substrate, and a liquid crystal layer provided between the first electrode and the second electrode, wherein the liquid crystal layer comprises the self-aligning liquid crystal material according to claim 6, and the liquid crystal molecules have a pretilt angle.

* * * * *